United States Patent
Ramasamy et al.

(10) Patent No.: US 10,560,443 B2
(45) Date of Patent: Feb. 11, 2020

(54) SCHEDULED POWER MODE SWITCH FOR THIN CLIENT DEVICES

(71) Applicant: Amzetta Technologies, LLC, Norcross, GA (US)

(72) Inventors: Veerajothi Ramasamy, Duluth, GA (US); Varadachari Sudan Ayanam, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 268 days.

(21) Appl. No.: 15/460,579

(22) Filed: Mar. 16, 2017

(65) Prior Publication Data
US 2018/0267593 A1 Sep. 20, 2018

(51) Int. Cl.
| H04L 29/06 | (2006.01) |
| G06F 1/32 | (2019.01) |
| G06F 9/4401 | (2018.01) |
| G06F 1/3206 | (2019.01) |
| G06F 1/329 | (2019.01) |

(52) U.S. Cl.
CPC ............ H04L 63/08 (2013.01); G06F 1/3206 (2013.01); G06F 1/329 (2013.01); G06F 9/4418 (2013.01)

(58) Field of Classification Search
None
See application file for complete search history.

(56) References Cited

U.S. PATENT DOCUMENTS

| 9,665,169 B1 * | 5/2017 | Dai | G06F 3/011 |
| 10,177,934 B1 * | 1/2019 | Marr | H04L 12/40032 |
| 2003/0149866 A1 * | 8/2003 | Neuman | G06F 1/3203 713/1 |
| 2004/0255171 A1 * | 12/2004 | Zimmer | G06F 1/3203 713/300 |
| 2006/0123253 A1 * | 6/2006 | Morgan | G06F 1/3228 713/300 |
| 2008/0082845 A1 * | 4/2008 | Morisawa | G06F 1/3203 713/323 |
| 2011/0022812 A1 * | 1/2011 | van der Linden | G06F 9/5077 711/163 |
| 2011/0252252 A1 * | 10/2011 | Ramakrishnan | G06F 1/3284 713/320 |
| 2012/0324254 A1 * | 12/2012 | Venkatavaradhan | G06F 1/266 713/310 |
| 2013/0086399 A1 * | 4/2013 | Tychon | G06F 1/3209 713/320 |
| 2015/0372996 A1 * | 12/2015 | Schrum, Jr. | H04L 63/061 713/171 |
| 2016/0334862 A1 * | 11/2016 | Hobbs | G06F 1/3234 |

(Continued)

*Primary Examiner* — Jaweed A Abbaszadeh
*Assistant Examiner* — Cheri L Harrington
(74) *Attorney, Agent, or Firm* — Locke Lord LLP; Tim Tingkang Xia, Esq.

(57) ABSTRACT

Certain aspects direct to systems and methods for performing scheduled power mode switch for thin client computing device. The system includes a server a computing device. The server receives a plurality of inputs, generates, based on the inputs, a power mode switch schedule including at least one sleep time and at least one wake time, and controls at least one computing device functions as a thin client to update configuration data of the at least one computing device with the power mode switch schedule and to switch between the wake mode the sleep mode according to the updated configuration data.

17 Claims, 7 Drawing Sheets

(56) References Cited

U.S. PATENT DOCUMENTS

2016/0337966 A1* 11/2016 Wieman ............ H04W 52/0216
2016/0370843 A1* 12/2016 Gatson .................. G06F 1/3234
2017/0177063 A1*  6/2017 Ederbach .............. G06F 1/3231
2017/0308151 A1* 10/2017 Zhang ................... G06F 1/3284
2017/0336884 A1* 11/2017 Pavlou .................... G06F 3/038

* cited by examiner

SCHEDULED POWER MODE SWITCH FOR THIN CLIENT DEVICES

FIELD

The present disclosure relates generally to thin client device technology, and more particularly to systems and methods for performing scheduled power mode switch for thin client devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A thin client device or zero client device is a computer solution whose major role is to connect a physical machine or virtual machine via remote access protocol using the operating system (OS) and other applications programmed in the hardware. A thin client device can be a small device with minimal requirement for hardware such as keyboard, mouse, monitor, universal series bus (USB) port or Ethernet card, and can therefore be particular useful for education, health care, gaming, advertisement, or other uses. Once a remote session is established to a server using a thin client device, all the user activity is processed on the remote server, which can be a physical machine or a virtual machine, and the server side infrastructure can be cloud computing applications or a virtual desktop infrastructure (VDI) server station. And then, the data is stored back in the remote server. Accordingly, the thin clients devices provide high security by storing data in a centralized location if having been configured appropriately to enhance security.

Still, such a centralized solution also provides benefits in various aspects other than security, including ease of maintenance, hardware requirement optimization, and facilitation of green technology. Specifically, as the thin client or zero client device is built with minimal hardware, its power consumption is less compared to a typical personal computer (PC). In general, a thin client device can consume 61%-70% less energy than a typical PC, and therefore, use of a thin client device reduces carbon foot prints.

However, when a thin client device is not used, it is idle and still consumes energy. Accordingly, the power consumption of the thin client device has not been reduced to a reasonably possible extent.

Therefore, an unaddressed need exists in the art to address the aforementioned deficiencies and inadequacies.

SUMMARY

Certain aspects of the present disclosure direct to a system, which includes a server computing device. The server computing device includes a processor and a storage device storing computer executable code which, when executed at the processor, is configured to: receive a plurality of inputs, and generate a power mode switch schedule based on the inputs; and control at least one computing device to switch between a wake mode and a sleep mode according to the power mode switch schedule, wherein the at least one computing device functions as a thin client, and the power mode switch schedule comprises at least one sleep time and at least one wake time.

In certain embodiments, the computer executable code of the server computing device is further configured to control the at least one computing device to switch between the wake mode and the sleep mode by: sending the power mode switch schedule to the at least one computing device; controlling the at least one computing device to update configuration data of the at least one computing device with the power mode switch schedule; and controlling the at least one computing device to switch between the wake mode and the sleep mode according to the updated configuration data.

In certain embodiments, the computer executable code of the server computing device is further configured to: receive a present power mode switch schedule in the configuration data from the at least one computing device; compare the power mode switch schedule with the present power mode switch schedule in the configuration data; determine if the power mode switch schedule is different from the present power mode switch schedule; in response to determining the power mode switch schedule is different from the present power mode switch schedule, send the power mode switch schedule to the at least one computing device to update the configuration data; and in response to determining the power mode switch schedule is the same as the present power mode switch schedule, not send the power mode switch schedule to the at least one computing device, and generate a notice indicating the power mode switch schedule is the same as the present power mode switch schedule.

In certain embodiments, the computer executable code of the server computing device is further configured to control the at least one computing device to: receive current time information; compare current time information with the configuration data; determine if the current time information matches at least one of scheduled power mode switches in the updated configuration data; and in response to determining the current time information does not match any of the scheduled power mode switches, not perform any scheduled power mode switch.

In certain embodiments, the computer executable code of the server computing device is further configured to control the at least one computing device to: determine whether current time matches the at least one wake time or at least one sleep time; receive current power mode information; compare the current power mode information with configuration data; determine if a current power mode of the at least one computing device is the same as a power mode conditioned for any of the scheduled power mode switches to start from corresponding to current time; in response to determining the current power mode and the conditioned power mode are the wake mode, switch the current power mode from the wake mode into the sleep mode according to the updated configuration data; in response to determining the current power mode and the conditioned power mode are the sleep mode, switch the current power mode from the sleep mode into the wake mode according to the updated configuration data; and in response to determining the current power mode is not the conditioned power mode, not perform any of the scheduled power mode switches.

In certain embodiments, the computer executable code of the server computing device is further configured to: receive authentication information from a user; verify the authentication information; determine the user is an administrator; allow the administrator to input data including the power mode switch schedule in the server computing device; determine the user is an authorized user; and add to the configuration data with a condition requiring the authorized user's confirmation on each of scheduled power mode switches from the wake mode to the sleep mode, such that the user decides, on each of the scheduled power mode switches from the wake mode to the sleep mode, between allowing the computing device to enter into the sleep mode as scheduled, and declining the scheduled mode switch and maintaining in the wake mode.

In certain embodiments, the computer executable code of the server computing device is further configured to: receive an anticipated start time and an anticipated end time of an active period; determine an earliest wake time of the at least one computing device based on the anticipated start time and a predetermined interval such that an administrator is allowed to input a scheduled wake time of the at least one computing device between the earliest wake time and the anticipated start time; and determine a sleep time of the computing device based on the anticipated end time such that the administrator is allowed to input a scheduled sleep time the same as the anticipated end time, wherein the predetermined interval is substantially equal to a time period required for the computing device to switch from the sleep mode to the wake mode.

Certain aspects of the present disclosure direct to a method for performing scheduled power mode switch for at least one computing device. In certain embodiments, the method includes: receiving, by a server computing device, a plurality of inputs, and generating, by the server, a power mode switch schedule based on the inputs; and controlling, by the server computing device, at least one computing device to switch between a wake mode and a sleep mode according to the power mode switch schedule, wherein the at least one computing device functions as a thin client, and the power mode switch schedule comprises at least one sleep time and at least one wake time.

In certain embodiments, the method further comprises: sending, by the server computing device, the power mode switch schedule to the at least one computing device; controlling, by the server computing device, the at least one computing device to update configuration data of the at least one computing device with the power mode switch schedule; and controlling, by the server computing device, the at least one computing device to switch between the wake mode and the sleep mode according to the updated configuration data.

In certain embodiments, the method further comprises: receiving, by the server computing device, a present power mode switch schedule in the configuration data from the at least one computing device; comparing, by the server computing device, the power mode switch schedule with the present power mode switch schedule in the configuration data; determining, by the server computing device, if the power mode switch schedule is different from the present power mode switch schedule; in response to determining the power mode switch schedule is different from the present power mode switch schedule, sending, by the server computing device, the power mode switch schedule to the at least one computing device to update the configuration data; and in response to determining the power mode switch schedule is the same as the present power mode switch schedule, not sending, by the server computing device, the power mode switch schedule to the at least one computing device, and generating, by the server computing device, a notice indicating the power mode switch schedule is the same as the present power mode switch schedule.

In certain embodiments, the method further comprises controlling, by the server computing device, the at least one computing device to: receive current time information; compare current time information with the configuration data; determine if the current time information matches at least one of scheduled power mode switches in the updated configuration data; and in response to determining the current time information does not match any of the scheduled power mode switches, not perform any scheduled power mode switch.

In certain embodiments, the method further comprises controlling, by the server computing device, the at least one computing device to: determine whether current time matches the at least one wake time or at least one sleep time; receive current power mode information; compare the current power mode information with configuration data; determine if a current power mode of the at least one computing device is the same as a power mode conditioned for any of the scheduled power mode switches to start from corresponding to current time; in response to determining the current power mode and the conditioned power mode are the wake mode, switch the current power mode from the wake mode into the sleep mode according to the updated configuration data; in response to determining the current power mode and the conditioned power mode are the sleep mode, switch the current power mode from the sleep mode into the wake mode according to the updated configuration data; and in response to determining the current power mode is not the conditioned power mode, not perform any of the scheduled power mode switches.

In certain embodiments, the method further comprises: receiving, by the server computing device, authentication information from a user; verifying, by the server computing device, the authentication information; determining, by the server computing device, the user is an administrator; and allowing, by the server computing device, the administrator to input data including the power mode switch schedule in the server computing device.

In certain embodiments, the method further comprises: receiving, by the server computing device, authentication information from a user; verifying, by the server computing device, the authentication information; determining, by the server computing device, the user is an authorized user; and adding, by the server computing device, to the configuration data with a condition requiring the authorized user's confirmation on each of scheduled power mode switches from the wake mode to the sleep mode, such that the user decides, on each of the scheduled power mode switches from the wake mode to the sleep mode, between allowing the computing device to enter into the sleep mode as scheduled, and declining the scheduled mode switch and maintaining in the wake mode.

In certain embodiments, the method further comprises receiving, by the server computing device, an anticipated start time and an anticipated end time of an active period; determining, by the server computing device, an earliest wake time of the at least one computing device based on the anticipated start time and a predetermined interval such that an administrator is allowed to input a scheduled wake time of the at least one computing device between the earliest wake time and the anticipated start time; and determining, by the server computing device, a sleep time of the computing device based on the anticipated end time such that the administrator is allowed to input a scheduled sleep time the same as the anticipated end time, wherein the predetermined interval is substantially equal to a time period required for the computing device to switch from the sleep mode to the wake mode.

Certain aspects of the present disclosure direct to a non-transitory computer readable medium storing computer executable code. The computer executable code, when executed at a processor of the server of the system, is configured to: receive a plurality of inputs, and generate a power mode switch schedule based on the inputs; and control at least one computing device to switch between a wake mode and a sleep mode according to the power mode switch schedule, wherein the at least one computing device functions as a thin client, and the power mode switch schedule comprises at least one sleep time and at least one wake time.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
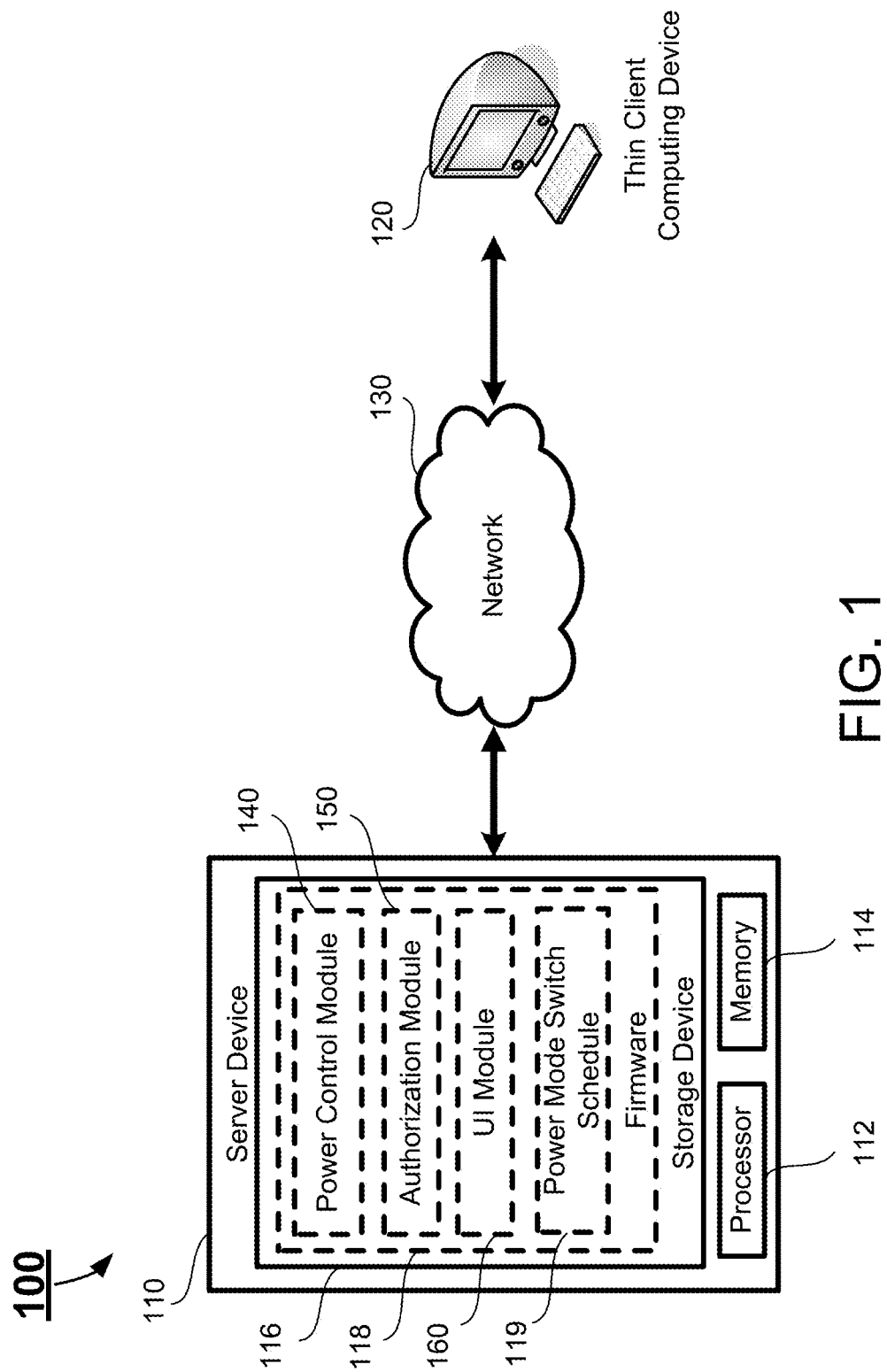
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied for performing scheduled power mode switch for thin client devices. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for performing scheduled power mode switch for thin client devices. As discussed above, when a thin client device is not used, it is idle and still consumes energy, and the power consumption of the thin client device is not reduced to a reasonably possible extent. Therefore, the systems and methods for configuring the thin client devices by performing scheduled power mode switch for thin client devices can provide a cost effective solution.

FIG. 1 schematically depicts a system according to certain embodiments of the present disclosure. In certain embodiments, the system 100 has a client-server structure. As shown in FIG. 1, the system 100 includes a server device 110 and at least one thin client computing devices 120 communicatively connected to the server device 110 via a network 130. In certain embodiments, the system 100 has a plurality of thin client computing devices 120. In certain embodiments, the network 130 may be a wired or wireless network, and may be of various forms. Examples of the network 130 may include, but is not limited to, a local area network (LAN), a wide area network (WAN) including the Internet, or any other type of networks.

The server device 110 is a computing device functioning as a server of the system 100. In certain embodiments, the server device 110 may be a provider of resources or services for the at least one thin client computing device 120, i.e., the clients of the system 100. For example, the system may be a VDI system, and the server device 110 may be a VDI server, which provides a plurality of virtual machines (VM) for the thin clients (i.e., a plurality of thin client computing devices 120), such that all users are accessing or connecting to the VMs from the thin client computing devices 120. The server device 110 provides most of the resources of the system 100, which will be shared to all of the VMs accessed by the users from the thin client computing devices 120. An administrator may schedule power mode switch of the thin client computing devices 120 corresponding to specific times through the server device 110. In certain embodiments, the system 100 may include more than one server device 110, which functions as one or more servers. In certain embodiments, a server may be implemented by one single server device 110, or by multiple server devices 110.

The thin client computing device 120 is a device functioning as the thin client of the system 100. In certain embodiments, the thin client computing device 120 may be a lightweight computer with minimal requirement for hardware, whose user activity is processed on the VM provided by the server device 110. In certain embodiments, the thin client computing device 120 may receive instruction from the server device 110 to schedule power mode switches corresponding to specific times. In certain embodiments, at least two of the thin client computing devices 120 may have their power mode switch schedule different from each other according to different power mode switch schedule data received respectively from the server device 110. In certain embodiments, each of the thin client computing devices 120 may be identical to one another.

In certain embodiments, the thin client computing device 120 may switch between wake mode and sleep mode according to scheduled sleep and wakeup procedures on specific times, with a power consumption degree of the thin client computing device 120 in the sleep mode being less than that in the wake mode.

In certain embodiments, a wake mode is a mode when any documents opened and/or programs running on the thin client computing device 120 are in full and normal operation, without restriction of power supply to principle components of the thin client computing device 120 such as processors, and/or without restriction of power supply to volatile data storage, such as random-access memory (RAM), to an extent that the volatile data storage is supplied with a minimum power merely sufficient to retain the data of the current status of the thin client computing device 120, including those of the opened documents and/or running programs.

In certain embodiments, a sleep mode is a mode when current status of any opened documents and/or running programs on the thin client computing device 120 are saved and retained in the volatile data storage supplied with a minimum power merely sufficient to retain the data of the current status of the thin client computing device 120, and power supply is removed or minimized to a predetermined extent from components and subsystems of the thin client computing device 120 that are predetermined as unnecessary. The sleep mode allows quick resumption of the thin client computing device 120 to fully-operating wake mode.

In certain embodiments, the server device 110 includes a processor 122, a memory 124, a storage device 126 storing a firmware 118. Further, the server device 110 may include other hardware components and software components (not shown) to perform its corresponding tasks. For example, the server device 110 may include, but not limited to, other required memory, interfaces, buses, Input/Output (I/O) modules, network interface cards (NICs) and peripheral devices.

The processor 112 is configured to control operation of the server device 110. In certain embodiments, the processor 112 may be a central processing unit (CPU). The processor 112 can execute any computer executable code or instructions, such as the firmware 118 or other applications and instructions of the server device 110. In certain embodiments, the server device 110 may run on more than one processor, such as two processors, four processors, eight processors, or any suitable number of processors.

The memory 114 can be a volatile memory, such as the random-access memory (RAM), for storing the data and information during the operation of the server device 110. In certain embodiments, the memory 114 may be a volatile memory array. In certain embodiments, the server device 110 may run on more than one memory 114.

The storage device 116 is a local non-volatile data storage media for storing the computer executable code or instructions and other necessary data of the server device 110. In certain embodiments, the computer executable code or instructions of the server device 110 may be implemented as one or more application programs or modules. Examples of the storage device 116 may include non-volatile memory such as flash memory, memory cards, hard drives, floppy disks, optical drives, or any other types of data storage devices. In certain embodiments, the server device 110 may have multiple storage devices 116, which may be identical storage devices or different types of storage devices, and the computer executable code or instructions of the server device 110 may be stored in one or more of the storage devices 116 of the server device 110. In certain embodiments, the storage device 116 stores the power mode switch schedule 119 generated by the authorization module 150 based on the information including wake times and sleep times of at least one thin client computing device 120 input by an administrator. In certain embodiments, the storage device 116 stores authorization levels for users of the thin client computing device 120 and an authorization level of each of the users of the thin client computing device 120.

In certain embodiments, the computer executable code or instructions being stored in the local storage device 116 of the server device 110 includes firmware 118. The firmware 118 is a collective management software managing the operation of the server device 110. In certain embodiments, the firmware 118 may include one or more firmware modules, which may be implemented by the computer executable codes or instructions to collectively form the firmware 118. For example, the firmware 118 may include, among other things, a power control module 140, an authorization module 150 and an user interface (UI) module 160. In certain embodiments, the power control module 140, the authorization module 150 and the UI module 160 may be independent and separate modules from the firmware 150.

The UI module 160 is configured to generate various UIs and display the UIs to an administrator of the server device 110, showing information including current schedule of power mode switch of the thin client computing device 120. The UI module 160 allows the administrator to input information including schedule of power mode switch of thin client computing device 120, and anticipated start and end time of each of active periods of thin client computing device 120 through, for example keyboard, video, mouse (KVM).

The power control module 140 is configured to generate and provide power mode switch schedule 119 for the thin client computing device 120 according to the administrator's inputs, including schedule of power mode switch of thin client computing device 120, and anticipated start and end time of each of active periods of thin client computing device 120. The power control module 140 is configured to control the thin client computing device 120 to switch between the wake mode and the sleep mode according to the power mode switch schedule 119.

In certain embodiments, the power control module 140 may receive data input by the administrator including schedule of power mode switch corresponding to a specific thin client computing device among a plurality of thin client computing devices 120, determine and match the corresponding thin client computing device 120 for the schedule data to be sent, send the schedule data to the corresponding thin client computing device 120 to update configuration file 190 storing schedule of power mode switch for the specific thin client computing device 120.

Figure 2:
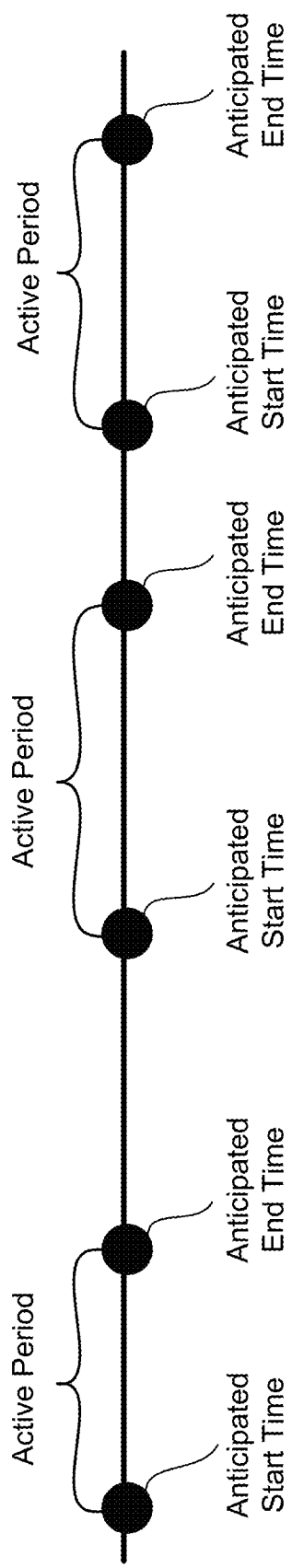
FIG. 2 schematically depicts an active period of the thin client computing device 120 according to certain embodiments of the present disclosure.

Referring both to FIGS. 1 and 2. FIG. 2 schematically depicts an active period of the thin client computing device 120 according to certain embodiments of the present disclosure. In certain embodiments, an active period is defined as a time period between an anticipated start time and its immediately following anticipated end time. There can be a plurality of active periods in a single day, a single week, and/or a single year.

In certain embodiments, the active periods may be recurrent time periods, for example, AM 09:30-PM 12:30 and PM 01:30-PM 05:30 on each day. In certain embodiments, the administrator may select through the UIs to exempt weekends, national holidays and/or any dates designated by the administrator from the dates active periods fall in. For example, the active periods with selected exemption may be AM 09:30-PM 12:30 and PM 01:30-PM 05:30 on each of Monday through Friday.

In certain embodiment, the administrator may, according to ordinary work hours of an office where a particular thin client computing device 120 located, input schedule data through UI to the power control module 140 to schedule for power mode switch of the particular thin client computing device 120. For example, if the ordinary work hour of an office is AM 09:30-PM 12:30 and PM 01:30-PM 05:30, the administrator may input through UI schedule data including:

a) on AM 09:25 and on PM 01:25, when the thin client computing device 120 is in a sleep mode, changing the power mode of the thin client computing device 120 from the sleep mode to wake mode, so that the thin client computing device 120 would be ready and running in a fully operating wake mode when users/employees arrive at anticipated start times of active periods; and when the thin client computing device 120 is in a wake mode, does not change the power mode of the thin client computing device 120; and b) on PM 12:30 and PM 05:30, when the thin client computing device 120 is in a wake mode, change the power mode of the thin client computing device 120 from the wake mode to a sleep mode, so that the thin client computing device 120 would be in energy-conserving sleep mode when users/employees leave at anticipated end times of active periods, and therefore the energy consumption of the thin client computing device 120 is further lowered; and when the thin client computing device 120 is in a sleep mode, does not change the power mode of the thin client computing device 120.

In certain embodiments, the power control module 140 may use Cron jobs to set and arrange, in the form of Crontab, power mode switch schedule for the thin client computing device 120, including active periods of the thin client computing device 120. A Crontab contains and specifies information including time and command to be executed corresponding to the time. The time information may include specific minute, hour, day, week and/or month when any corresponding command is set to be executed. In certain embodiment, the Crontab storing schedule of power mode switch for the specific thin client computing device 120 is stored in the firmware of the thin client computing device 120, and may be updated by the power control module 140. In certain embodiment, the Crontab is stored in the configuration file 190.

Figure 3:
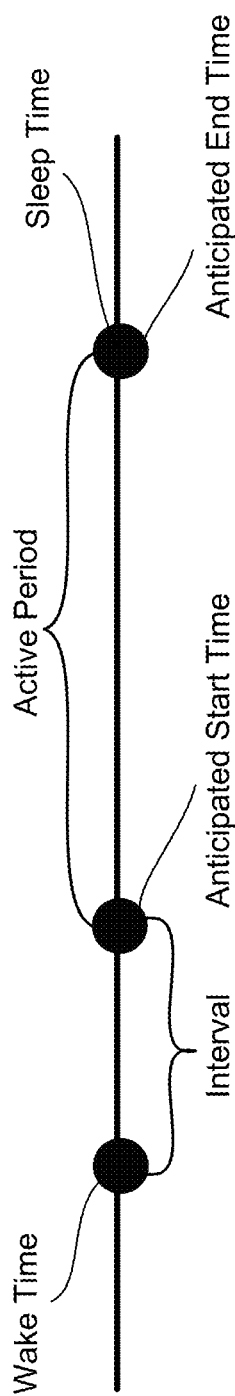
FIG. 3 schematically depicts the relationship between the setting of the wake and sleep times of the thin client computing device 120 and the anticipated start and end times of an active period according to certain embodiments of the present disclosure.

Referring to FIGS. 1-3. FIG. 3 schematically depicts the relationship between the setting of the wake and sleep times of the thin client computing device 120 and the anticipated start and end times of an active period according to certain embodiments of the present disclosure. In certain embodiment, the power control module 140 may receive from the administrator through UI information containing anticipated start time of each of active periods, and based on the information containing anticipated start time of each of active periods, send a command to the UI module 160 to configure the UI to allow the administrator only to input a scheduled wake time of the thin client computing device 120 to be within a time period immediately prior to the anticipated start time of each of the active periods, and a predetermined interval between the scheduled wake time and the anticipated start time substantially equals to a wakeup time period needed for the thin client computing device 120 to wake up from a sleep mode and enter into a fully operating wake mode. In certain embodiments, the interval may be predetermined based on experience, for example, around 30 seconds.

In certain embodiments, the interval may further comprise a predetermined reserve time period reserving for possible fault resolution relating to or resulting from the waking up process of the thin client computing device 120, and the reserve time period equals to or is less than the wakeup time period needed for the thin client computing device 120 to wake up from the sleep mode and enter into the fully operating wake mode.

In certain embodiments, the power control module 140 may receive from the administrator through UI information containing anticipated end time of each of active periods, and based on the information containing anticipated end time of each of active periods, send a command to the UI module to configure the UI to allow the administrator only to input a scheduled sleep time of the thin client computing device 120 as the anticipated end time of each of the active periods.

In certain embodiments, the power control module 140 may be configured to send the schedule data input by the administrator to the thin client computing device 120 to update configuration file 190 containing current schedule of power mode switch for the thin client computing device 120, only after the power control module 140 receives the configuration file 190 from the thin client computing device 120, compares the schedule data input by the administrator with the current schedule data in the configuration file 190, and determines whether the schedule data input by the administrator is the same as the current schedule data in the configuration file 190. When the power control module 140 determines the schedule data input by the administrator is the same as the current schedule data in the configuration file 190, the power control module 140 does not send the administrator's schedule data to the thin client computing device 120 to update the configuration file 190. Instead, the power control module 140 sends a command to the UI module 160 to configure the UI to display a notice indicating the schedule data input by the administrator is the same as the current power mode switch schedule of the thin client computing device 120. On the other hand, when the power control module 140 determines the schedule data input by the administrator is not completely the same as the current schedule data in the configuration file 190, the power control module 140 sends the schedule data input by the administrator to the thin client computing device 120 to update the configuration file 190.

The authorization module 150 is configured to receive and compare between user authentication/identify information, including user account and password, input by a current user of a thin client computing device 120 (under the scenario of multiple thin client computing devices 120, a first thin client computing device 120) through an UI of the thin client computing device 120, and, from the storage device 116, the user authorization level corresponding to the user information, to verify and determine the authorization level of the current user of the first thin client computing device 120. For example, the authorization levels may include administrator and non-administrator. In certain embodiments, if the current user is determined to be of authorization level of administrator, the authorization module 150 may send a command to the first thin client computing device 120 to unlock a function of the first thin client computing device 120 of allowing operating and managing the server device 110 from the first thin client computing device 120 via remote access protocol for the administrator-level user, such that the administrator-level user may connect to the service device 110 and access the management resources in the server device 110 from the first thin client computing device 120, so as to input schedule data of power mode switch for a second thin client computing device 120 in the second thin client computing device 120 through the first thin client computing device 120 and the server device 110.

On the other hand, in response to determining the current user is of authorization level of non-administrator, the authorization module 140 does not send the command to the first thin client computing device 120 to unlock the function of the first thin client computing device 120 of managing the server device 110 from the first thin client computing device 120 for the current user. Therefore, the non-administrator-level user cannot input schedule data of power mode switch for the second thin client computing device 120 through the first thin client computing device 120 and the server device 110.

In certain embodiments, the authorization levels may include overtime worker and non-overtime worker. In response to determining the current user is of authorization level of overtime worker, the authorization module 150 adds to the configuration file 190 of the thin client computing device 120 with condition requiring user's confirmation on each of the scheduled power mode switch from wake mode to sleep mode, and therefore the overtime-worker-level user may decide, on each scheduled wake-to-sleep power mode switch time, whether to allow the thin client computing device 120 to enter into sleep mode as scheduled or decline the scheduled mode switch, until next scheduled wake-to-sleep power mode switch when the overtime-worker-level user can again make the decision between allowance and decline.

On the other hand, in response to determining the current user is of authorization level of non-overtime worker, the authorization module 150 updates the configuration file 190 of the thin client computing device 120 to be of no condition requiring user's confirmation on each of the scheduled power mode switch from wake mode to sleep mode, and therefore the non-overtime-worker-level user cannot decide, on any of scheduled wake-to-sleep power mode switch times, whether to allow the thin client computing device 120 to enter into sleep mode as scheduled or decline the scheduled mode switch, and the thin client computing device 120 enters into the sleep mode on the scheduled mode switch times.

It is to be noted that a user can be designated both with one of the authorization levels of administrator and non-administrator and one of the overtime worker and non-overtime worker. Therefore, a user may be able to manage the mode switch schedule of another thin client computing device and to confirm on each of the scheduled power mode switch from wake mode to sleep mode; able to manage the mode switch schedule of another thin client computing device but not to confirm on any of the scheduled power mode switch from wake mode to sleep mode; able to confirm on each of the scheduled power mode switch from wake mode to sleep mode but not to manage the mode switch schedule of another thin client computing device; or not able to confirm on any of the scheduled power mode switch from wake mode to sleep mode nor to manage the mode switch schedule of another thin client computing device.

Figure 4:
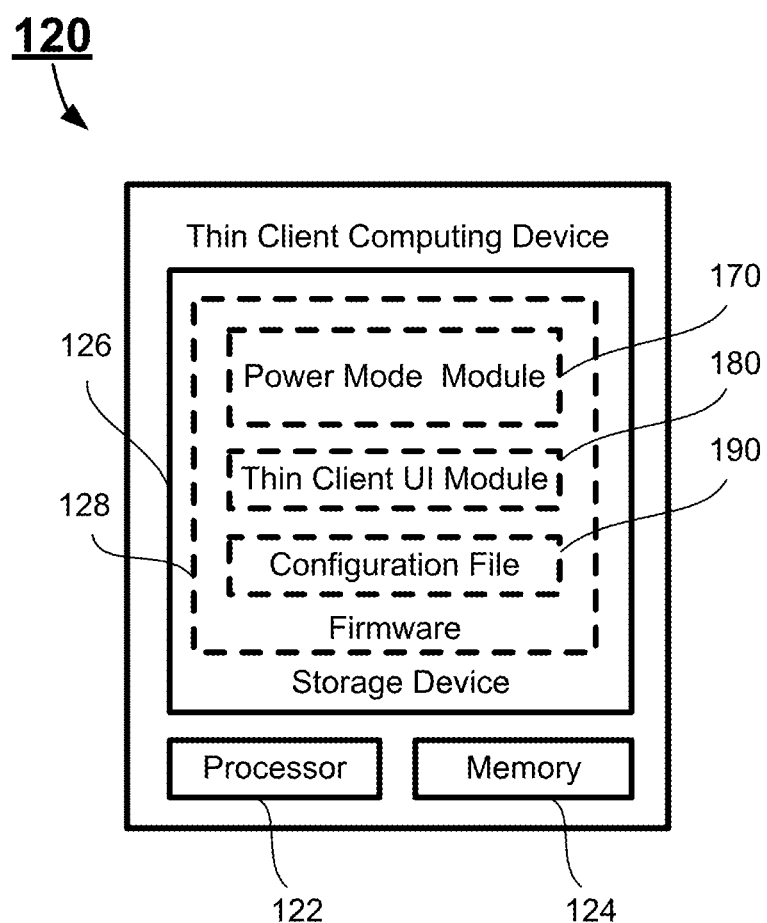
FIG. 4 schematically depicts a configuration of the thin client computing device according to certain embodiments of the present disclosure.

FIG. 4 schematically depicts the configuration of a thin client computing device 120 according to certain embodiments of the present disclosure. In certain embodiments, the thin client computing device 120 includes a processor 122, a memory 124, and a storage device 126. The thin client computing device 120 may include other hardware components and software components (not shown) to perform its corresponding tasks. For example, thin client computing device 120 may include, but not limited to, other required memory, interfaces, buses, Input/Output (I/O) modules, network interface cards (NICs) and peripheral devices.

The processor 122 is configured to control operation of the thin client computing device 120. In certain embodiments, the processor 122 may be a central processing unit (CPU). The processor 122 can execute any computer executable code or instructions, such as the firmware 150 or other applications and instructions of the thin client computing device 120. In certain embodiments, the thin client computing device 120 may run on more than one processor, such as two processors, four processors, eight processors, or any suitable number of processors.

The memory 124 can be a volatile memory, such as the random-access memory (RAM), for storing the data and information during the operation of the thin client computing device 120. In certain embodiments, the memory 124 may be a volatile memory array. In certain embodiments, the thin client computing device 120 may run on more than one memory 124.

The storage device 126 is a local non-volatile data storage media for storing the computer executable code or instructions and other necessary data of the thin client computing device 120. In certain embodiments, the computer executable code or instructions of the thin client computing device 120 may be implemented as one or more application programs or modules. Examples of the storage device 126 may include non-volatile memory such as flash memory, memory cards, hard drives, floppy disks, optical drives, or any other types of data storage devices. In certain embodiments, the thin client computing device 120 may have multiple storage devices 126, which may be identical storage devices or different types of storage devices, and the computer executable code or instructions of the thin client computing device 120 may be stored in one or more of the storage devices 126 of the thin client computing device 120. In certain embodiments, the storage devices 126 stores configuration file 190 of the thin client computing device 120, including schedule data of power mode switch on specific times and their corresponding mode types the thin client computing device 120 is switching from and into, and, if any, condition requiring user's confirmation on the mode switch.

As shown in FIG. 4, the computer executable code or instructions being stored in the local storage device 126 of the thin client computing device 120 includes firmware 128. The firmware 128 is a collective management software managing the operation of the thin client computing device 120. In certain embodiments, the firmware 128 may include one or more firmware modules, which may be implemented by the computer executable codes or instructions to collectively form the firmware 128. For example, the firmware 128 may include, among other things, a power mode module 170 and a thin client UI module 180.

The thin client user interface module 180 is configured to generate various UIs, display the UIs to the user of the thin client computing device 120, receive inputs from the user through, for example, keyboard, video, mouse (KVM), and facilitate the use and access of the resources in the server device 110 by the user through the thin client computing device 120. In certain embodiments, the thin client user interface module 180 may generate a graphical UI such that a user may change the setting of the thin client computing device 120 through the graphical user interface.

The power mode module 170 is configured to switch the power mode of the thin client computing device 120 between the wake mode and the sleep mode on specific times according to the power mode switch schedule stored in the configuration file 190 of the thin client computing device 120. In certain embodiments, the power mode module 170 sends the configuration file 190 to the power control module 140 of the server device 110 for comparing with the schedule data input by the administrator. In response to the power control module 140 determining the schedules are not the same, the power mode module 170 receives the schedule data input by the administrator from the power control module 130, and updates the configuration file 190 with the schedule data input by the administrator.

In certain embodiment, the power mode module 170 may determine the power mode of the thin client computing device 120 by detecting power supply level(s) to at least one of principal components, such as processor 122, of the thin client computing device 120 other than the memory 124. For example, the power mode module 170 may periodically receive from the processor 122, an electrical signal, such as a current value or a voltage value, indicating power supply level to the processor 122, and receive, from the storage device 126, a predetermined principal component power threshold for the electrical signal. When a value of the electrical signal is below the predetermined principal component power threshold for the electrical signal, the power mode module 170 determines that the thin client computing device 120 is in the sleep mode. When a value of the electrical signal equals or is above the predetermined principal component power threshold for the electrical signal, the power mode module 170 determines that the thin client computing device 120 is in the wake mode.

In certain embodiments, the power mode module 170 may determine the power mode of the thin client computing device 120 by detecting power supply level to the memory 124. For example, the power mode module 170 may periodically receive from the memory 124 an electrical signal, such as a current value or a voltage value, indicating power supply level to the memory 124, and receive, from the storage device 126, a predetermined memory power threshold for the electrical signal. The memory power threshold may be a power level supplied to the memory 124 just sufficient for the memory 124 to retain any data running on the thin client computing device 120 immediately prior to the thin client computing device 120 entering into a sleep mode, and, in certain embodiments, is set higher than the predetermined principal component threshold. When a value of the electrical signal is below the predetermined memory power threshold for the electrical signal, the power mode module 170 determines that the thin client computing device 120 is in the sleep mode. When a value of the electrical signal equals or is above the predetermined memory power threshold for the electrical signal, the power mode module 170 determines that the thin client computing device 120 is in the wake mode.

In certain embodiments, the power mode module 170 determines that the thin client computing device 120 is in the sleep mode in response to determining at least one of: a) power supply level to the memory 124 is below the predetermined memory power threshold; and b) power supply level to the principle component(s) is below the predetermined principal component power threshold.

In certain embodiments, the power mode module 170 determines that the thin client computing device 120 is in the wake mode only in response to determining both that a) power supply level to the memory 124 equals or is above the predetermined memory power threshold; and b) power supply level to the principle component(s) equals or is above the predetermined principal component power threshold.

It is to be noted that a power level supplied to the thin client computing device 120 in the sleep mode, either by external power and/or power storage within the thin client computing device 120, is sufficient to allow the power mode module 170 to receive the power level indicating electrical signals and determine the power mode of the thin client computing device 120.

In certain embodiments, the power mode module 170 may act as a Cron daemon application, and enforce power mode switch schedule for the thin client computing device 120 by using the Crontab storing the power mode switch schedule. In certain embodiments, the Crontab containing and specifying information including time and command to be executed corresponding to the time is stored in the configuration file 190, and may be updated by the power control module 140 of the server device 110. In certain embodiments, the power mode module 170 may determine the current time matches to any of the scheduled power mode switches of the power mode switch schedule by referring to the Crontab specifying the power mode switch schedule.

In certain embodiments, the power mode module 170 may periodically receive the current time information, without prior requesting for the current time information, or periodically request for the current time information and then receive the current time information. Then, the power mode module 170 compares the current time information with the power mode switch schedule in the configuration file 190 to determine if the current time matches at least one of the scheduled power mode switches. When the power mode module 170 determines the current time matches at least one of the scheduled power mode switches, the power mode module 170 compares the current power mode of the thin client computing device 120 and the power mode conditioned for the power mode switch corresponding to the current time, to determine if the current power mode is the power mode conditioned for the scheduled power mode switch corresponding to the current time, that is, whether either one of the two following condition is satisfied: a) the current power mode is wake mode, and the switch scheduled for the current time is from the wake mode to the sleep mode; or b) the current mode is sleep mode, and the switch scheduled for the current time is from the sleep mode to the wake mode.

In response to determining the current power mode is the power mode conditioned for the scheduled power mode switch, when the current power mode is wake mode, the power mode module 170 reduces the power supply to the memory 124 to be below the predetermined memory power threshold and therefore maintains a minimum power supply to the memory 124 just sufficient to retain current data including opened documents and running programs in the memory 124, reduces power supply to the principle component(s) of the thin client computing device 120 to be below the predetermined principle component power threshold, and therefore changes the power mode of the thin client computing device 120 from wake mode into sleep mode.

On the other hand, in response to determining the current power mode is the power mode conditioned for the scheduled power mode switch, when the current power mode is sleep mode, the power control module increases the power supply to the memory 124 to be or above the predetermined memory power threshold, increases power supply to the principle component(s) of the thin client computing device 120 to be or above the predetermined principle component power threshold, so as to allow the thin client computing device 120 to operate fully and normally and be ready for a user's ordinary use, and therefore change the power mode of the thin client computing device 120 from sleep mode into wake mode.

In certain embodiments, in response to determining the current time does not match any of the scheduled power mode switches, or in response to determining that the current power mode is not the power mode conditioned for a scheduled power mode switch, that is, under either one of the following two scenarios: a) the current mode is wake mode, and the switch scheduled for the current time is from the sleep mode to the wake mode; or b) the current mode is sleep mode, and the switch scheduled for the current time is from the wake mode to the sleep mode, the power mode module 170 does not command for the adjustment of the power supply to the principle components and the memory 124 of the thin client computing device 120.

In certain embodiments, the power mode module 170 may, based on the existence of the condition of user's confirmation on scheduled power mode switches from wake mode to sleep mode in the configuration file 190, instruct the thin client UI module 180 to configure the UI displayed to an overtime-worker level user to require the overtime-worker level user's confirmation through the UI. In response to receiving the client's confirmation on entering the sleep mode, the power mode module 170 enforce the afore-going power supply reduction to the principle components and the memory 124. On the other hand. In response to receiving the overtime-worker level user's confirmation on maintaining the wake mode or receiving no confirmation from the user, the power mode module 170 does not perform the power supply reduction. In certain embodiments, the power mode module 170 is configured to enforce the afore-going power supply reduction in response to failing to receive the overtime-worker level user's confirmation for a predetermined time period, for example, 5 minutes.

In certain embodiments, the power mode module 170 may be implemented and perform the afore-going duties including receiving, comparison and determination indifferent OS settings implemented on the thin client computing device 120. The OS is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, to process scheduled activities such as the scheduled power mode switches as detailed above, the thin client computing device 120 may employ Cron jobs in Linux settings, and may employ batch scripts with power shell in Windows setting.

Figure 5:
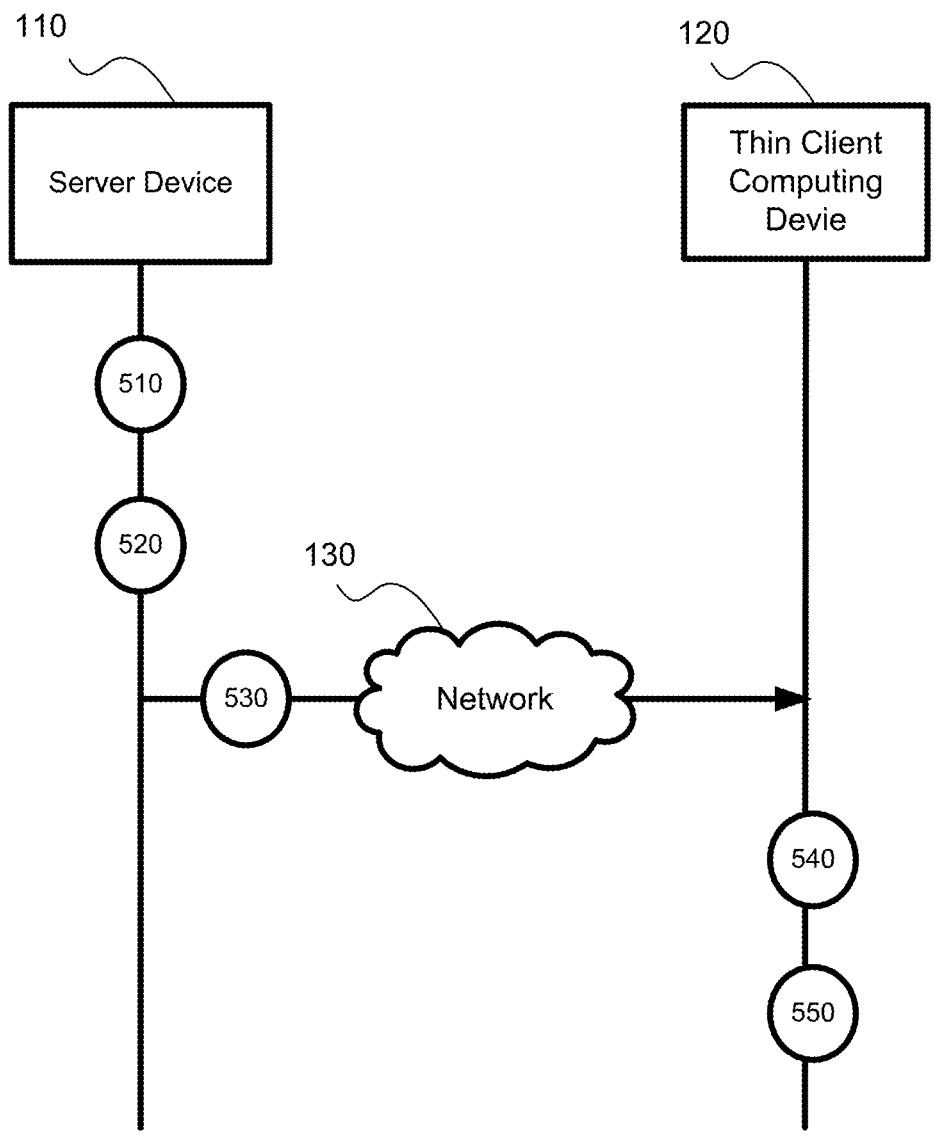
FIG. 5 depicts a flowchart showing a method for performing scheduled power mode switch for thin client devices according to certain embodiments of the present disclosure.

A further aspect of the present disclosure is directed to a method for performing scheduled power mode switch for thin client devices. FIG. 5 depicts a flowchart showing a method for performing scheduled power mode switch for thin client devices according to certain embodiments of the present disclosure. In certain embodiments, the method as shown in FIG. 5 may be implemented on a server (i.e., a server device 110) and a thin client (i.e., a thin client computing device 120) of the system 100 as shown in FIGS. 1 and 4. It should be particularly noted that the sequence of the procedures as described in the flowchart as shown in FIG. 5 may vary, and is thus not intended to limit the disclosure thereof.

As shown in FIG. 5, at procedure 510, the power control module 140 of the server device 110 receives a plurality of inputs including at least one wake time and at least one sleep time of the thin client computing device 120 from an administrator.

At procedure 520, the power control module 140 generates the power mode switch schedule 119 based on the plurality of inputs.

At procedure 530, the power control module 140 sends the power mode switch schedule 119 to the thin client computing device 120 through network 130, and the power mode module 170 of the thin client computing device 120 receives the power mode switch schedule 119.

At procedure 540, the power mode module 170 updates the configuration file 190 with the power mode switch schedule 119.

At procedure 550, the power mode module 170 switches between the wake mode and the sleep mode according to the power mode switch schedule 119.

Figure 6:
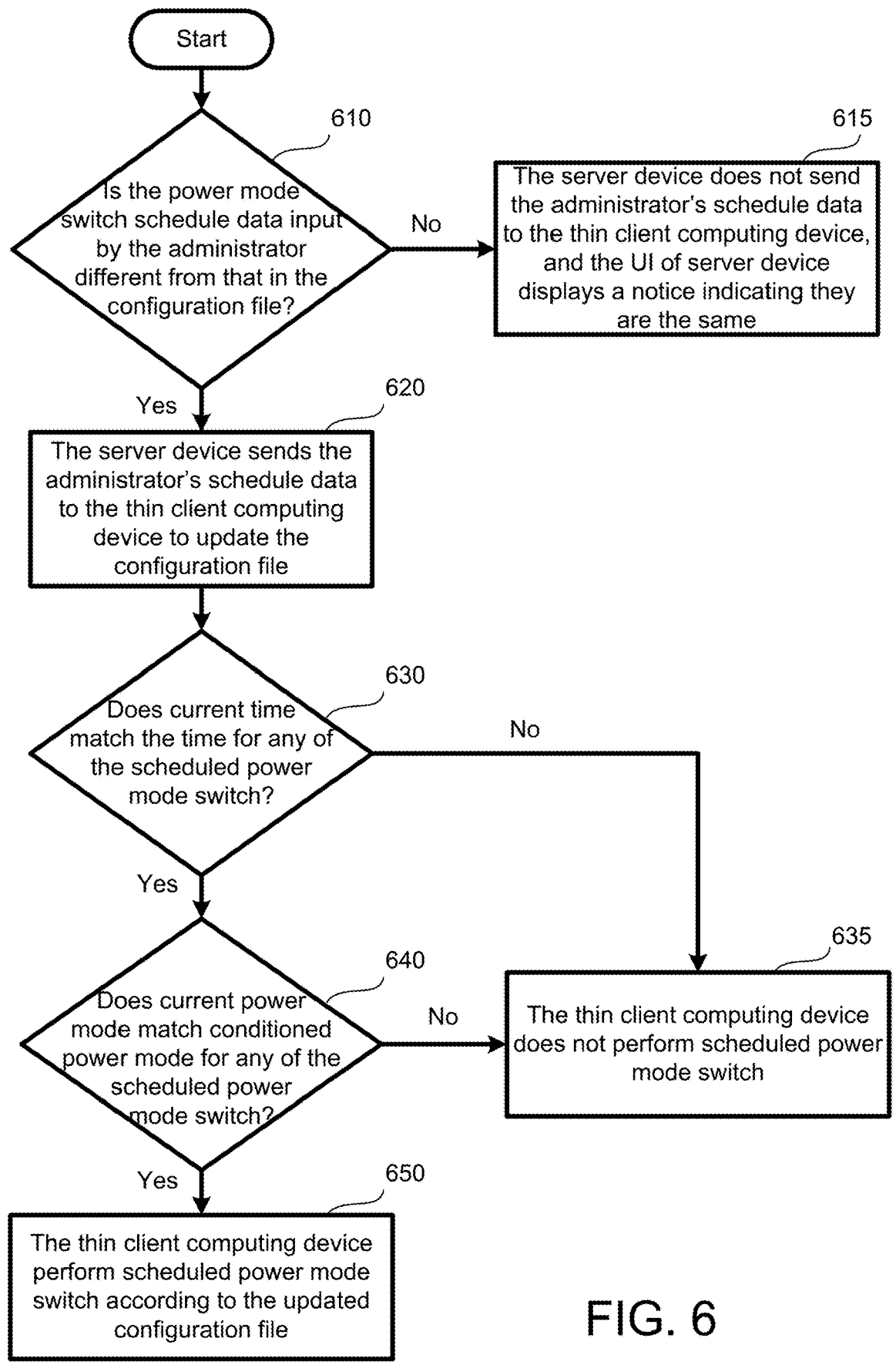
FIG. 6 depicts a flowchart showing a method for performing scheduled power mode switch for thin client devices according to certain embodiments of the present disclosure.

FIG. 6 depicts a flowchart showing further details of the method for performing scheduled power mode switch for thin client devices according to certain embodiments of the present disclosure. In certain embodiments, the method as shown in FIG. 6 may be implemented on a server (i.e., a server device 110) and a thin client (i.e., a thin client computing device 120) of the system 100 as shown in FIGS. 1 and 4. It should be particularly noted that the sequence of the procedures as described in the flowchart as shown in FIG. 6 may vary, and is thus not intended to limit the disclosure thereof.

As shown in FIG. 6, at procedure 610, the power control module 140 of the server device 110 determines whether the schedule data input by the administrator is different from the current schedule data in the configuration file 190. When the power control module 140 determines the schedule data input by the administrator is the same as the current schedule data in the configuration file 190, proceed to procedure 615. When the power control module 140 determines the schedule data input by the administrator is not completely the same as the current schedule data in the configuration file 190, proceed to procedure 620.

At procedure 615, the power control module 140 does not send the administrator's schedule data to the thin client computing device 120 to update the configuration file 190. Instead, the power control module 140 sends a command to the UI module 160 to configure the UI to display a notice indicating the schedule data input by the administrator is the same as the current power mode switch schedule of the thin client computing device 120.

At procedure 620, when the power control module 140 determines the schedule data input by the administrator is not completely the same as the current schedule data in the configuration file 190, the power control module 140 sends the schedule data input by the administrator to the thin client computing device 120 to update the configuration file 190.

At procedure 630, the power mode module 170 of the thin client computing device 120 compares the current time information with the power mode switch schedule in the configuration file 190 to determine if the current time matches at least one of the scheduled power mode switches. When the power mode module 170 determines the current time matches at least one of the scheduled power mode switches, proceed to procedure 640. When the power mode module 170 determines the current time does not match any of the scheduled power mode switches, proceed to procedure 635.

At procedure 635, in response to determining the current time does not match any of the scheduled power mode switches, the power mode module 170 does not command for the adjustment of the power supply to the principle components and the memory 124 of the thin client computing device 120, and the thin client computing device 120 does not perform scheduled power mode switch.

At procedure 640, in response to determining the current time matches at least one of the scheduled power mode switches, the power mode module 170 compares the current power mode of the thin client computing device 120 and the power mode required for the power mode switch corresponding to the current time, to determine if the current power mode is the power mode required for the scheduled power mode switch corresponding to the current time. When the current power mode matches the conditioned power mode, proceed to procedure 650. When the current power mode does not match the conditioned power mode, proceed to procedure 635.

At procedure 650, in response to determining the current power mode is the power mode conditioned for the scheduled power mode switch, the power mode module 170 performs scheduled power mode switch according to the updated configuration file 190 of the thin client computing device 120.

Figure 7:
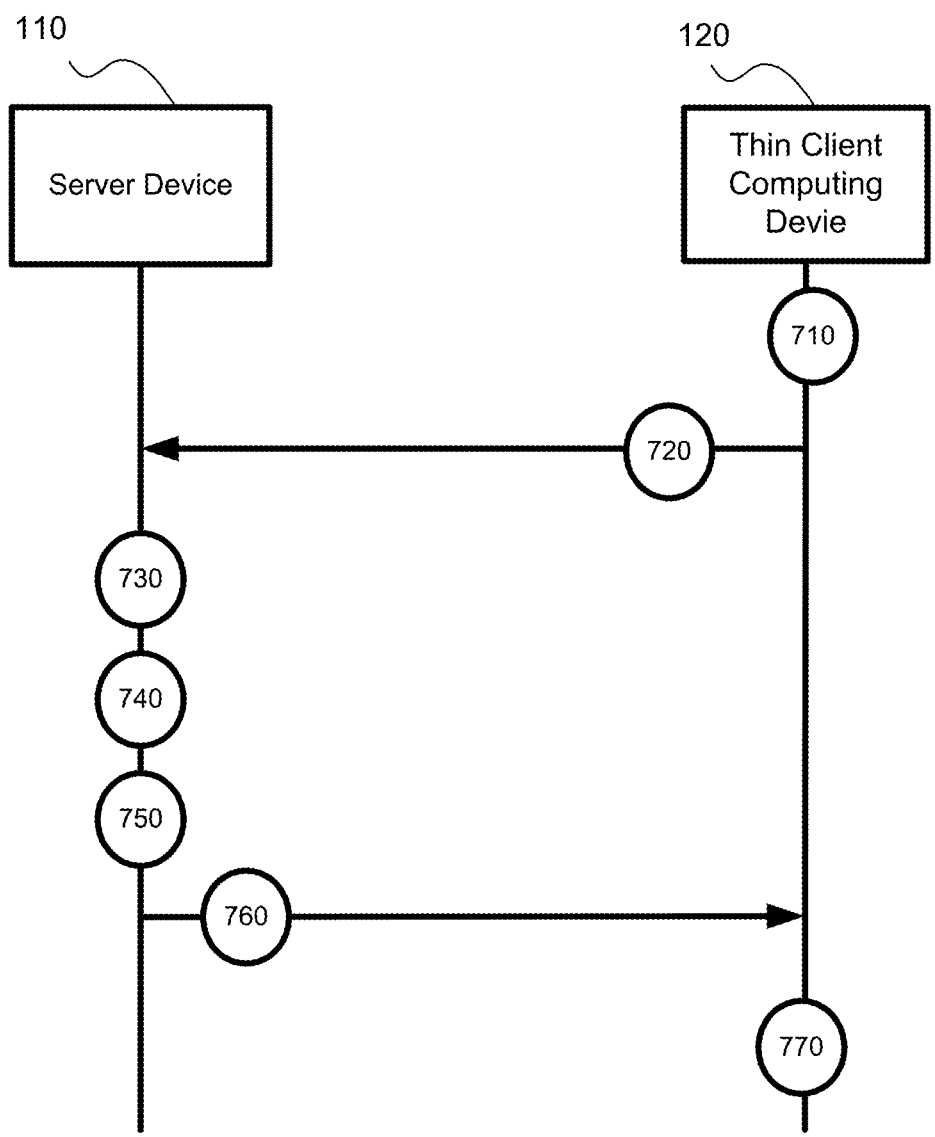
FIG. 7 depicts a flowchart showing a method for performing user identity authentication for scheduled power mode switch for thin client devices according to certain embodiments of the present disclosure.

FIG. 7 depicts a flowchart showing further details of the method for performing user identity authentication for scheduled power mode switch for thin client devices according to certain embodiments of the present disclosure. In certain embodiments, the method as shown in FIG. 7 may be implemented on a server (i.e., a server device 110) and a thin client (i.e., a thin client computing device 120) of the system 100 as shown in FIGS. 1 and 4. It should be particularly noted that the sequence of the procedures as described in the flowchart as shown in FIG. 7 may vary, and is thus not intended to limit the disclosure thereof.

At procedure 710, a user of the thin client computing device 120 inputs authentication information including account and password to the thin client computing device 120, and the power mode module 170 of the thin client computing device 120 receives the authentication information of the user.

At procedure 720, the power mode module 170 sends the authentication information to the server device 110, and the authorization module 150 of the server device 110 receives the authentication module 150.

At procedure 730, the authorization module 150 verifies the authentication according to the authorization levels and corresponding user identities stored in storage device 116.

At procedure 740, the authorization module 150 determines the user is an administrator and allows the administrator to input data including the power mode switch schedule in the server device 110

At procedure 750, the authorization module 150 determines the user is an authorized user, and generates a command containing condition requiring the authorized user's confirmation on each of scheduled power mode switches from the wake mode to the sleep mode.

At procedure 760, the authorization module 150 sends the command to the thin client computing device 120.

At procedure 770, the power mode module 170 add to the configuration file with the condition, such that the user decides, on each of the scheduled power mode switches from the wake mode to the sleep mode, between allowing the computing device to enter into the sleep mode as scheduled, and declining the scheduled mode switch and maintaining in the wake mode.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 116 of the server device 110 and the storage device 126 of the thin client computing device 120 as shown in FIGS. 1 and 4.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a server computing device, comprising a processor and a storage device storing computer executable code, wherein the computer executable code, when executed at the processor, is configured to:
receive a plurality of inputs, and generate a power mode switch schedule based on the inputs;
control at least one computing device to switch between a wake mode and a sleep mode according to the power mode switch schedule, wherein the at least one computing device functions as a thin client, and the power mode switch schedule comprises at least one sleep time and at least one wake time;
receive an anticipated start time and an anticipated end time of an active period;
determine an earliest wake time of the at least one computing device based on the anticipated start time and an interval such that an administrator is allowed to input a scheduled wake time of the at least one computing device between the earliest wake time and the anticipated start time; and
determine a sleep time of the at least one computing device based on the anticipated end time such that the administrator is allowed to input a scheduled sleep time the same as the anticipated end time;
wherein the interval comprises:
a predetermined interval equal to a time period required for the at least one computing device to switch from the sleep mode to the wake mode; and
a predetermined reserve time period reserving for possible fault resolution relating to or resulting from waking up the at least one computing device, the predetermined reserve time period equal to or less than the time period needed for the at least one computing device to switch from the sleep mode to the wake mode.

2. The system as claimed in claim 1, wherein the computer executable code, when executed at the processor, is configured to control the at least one computing device to switch between the wake mode and the sleep mode by:
sending the power mode switch schedule to the at least one computing device;
controlling the at least one computing device to update configuration data of the at least one computing device with the power mode switch schedule; and
controlling the at least one computing device to switch between the wake mode and the sleep mode according to the updated configuration data.

3. The system as claimed in claim 1, wherein the computer executable code, when executed at the processor, is further configured to control the at least one computing device to:
determine whether current time matches the at least one wake time or at least one sleep time;
receive current power mode information;
compare the current power mode information with configuration data;
determine if a current power mode of the at least one computing device is the same as a power mode conditioned for any of scheduled power mode switches to start from corresponding to current time;
in response to determining the current power mode and the conditioned power mode are the wake mode, switch the current power mode from the wake mode into the sleep mode according to the configuration data;
in response to determining the current power mode and the conditioned power mode are the sleep mode, switch the current power mode from the sleep mode into the wake mode according to the updated configuration data.

4. The system as claimed in claim 1, wherein the computer executable code, when executed at the processor, is further configured to:
receive authentication information from a user;
verify the authentication information;
determine whether the user is an administrator; and
in response to determining that the user is the administrator, allow the administrator to input data including the power mode switch schedule in the server computing device.

5. The system as claimed in claim 1, wherein the computer executable code, when executed at the processor, is further configured to:
  receive authentication information from a user;
  verify the authentication information;
  determine whether the user is an authorized user; and
  in response to determining that the user is the authorized user, add to the configuration data with a condition requiring the authorized user's confirmation on each of scheduled power mode switches from the wake mode to the sleep mode, such that the user decides, on each of the scheduled power mode switches from the wake mode to the sleep mode, between allowing the computing device to enter into the sleep mode as scheduled, and declining the scheduled mode switch and maintaining in the wake mode.

6. The system as claimed in claim 1, wherein the computer executable code, when executed at the processor, is further configured to:
  receive a present power mode switch schedule in configuration data from the at least one computing device;
  compare the power mode switch schedule with the present power mode switch schedule in the configuration data;
  determine if the power mode switch schedule is different from the present power mode switch schedule;
  in response to determining the power mode switch schedule is different from the present power mode switch schedule, send the power mode switch schedule to the at least one computing device to update the configuration data; and
  in response to determining the power mode switch schedule is the same as the present power mode switch schedule, not send the power mode switch schedule to the at least one computing device, and generate a notice indicating the power mode switch schedule is the same as the present power mode switch schedule.

7. The system as claimed in claim 1, wherein the computer executable code, when executed at the processor, is further configured to control the at least one computing device to:
  receive current time information;
  compare current time information with the configuration data;
  determine if the current time information matches at least one of scheduled power mode switches in the updated configuration data; and
  in response to determining the current time information does not match any of the scheduled power mode switches, not perform any scheduled power mode switch.

8. A method for performing scheduled power mode switch for at least one computing device, the method comprising:
  receiving, by a server computing device, a plurality of inputs, and generating, by the server, a power mode switch schedule based on the inputs;
  controlling, by the server computing device, at least one computing device to switch between a wake mode and a sleep mode according to the power mode switch schedule, wherein the at least one computing device functions as a thin client, and the power mode switch schedule comprises at least one sleep time and at least one wake time;
  receiving, by the server computing device, an anticipated start time and an anticipated end time of an active period;
  determining, by the server computing device, an earliest wake time of the at least one computing device based on the anticipated start time and an interval such that an administrator is allowed to input a scheduled wake time of the at least one computing device between the earliest wake time and the anticipated start time; and
  determining, by the server computing device, a sleep time of the at least one computing device based on the anticipated end time such that the administrator is allowed to input a scheduled sleep time the same as the anticipated end time;
  wherein the interval comprises:
    a predetermined interval equal to a time period required for the at least one computing device to switch from the sleep mode to the wake mode; and
    a predetermined reserve time period reserving for possible fault resolution relating to or resulting from waking up the at least one computing device, the predetermined reserve time period equal to or less than the time period needed for the at least one computing device to switch from the sleep mode to the wake mode.

9. The method as claimed in claim 8, further comprising:
  sending, by the server computing device, the power mode switch schedule to the at least one computing device;
  controlling, by the server computing device, the at least one computing device to update configuration data of the at least one computing device with the power mode switch schedule; and
  controlling, by the server computing device, the at least one computing device to switch between the wake mode and the sleep mode according to the updated configuration data.

10. The method as claimed in claim 8, wherein the method further comprises
  controlling, by the server computing device, the at least one computing device to:
  determine whether current time matches the at least one wake time or at least one sleep time;
  receive current power mode information;
  compare the current power mode information with configuration data;
  determine if a current power mode of the at least one computing device is the same as a power mode conditioned for any of scheduled power mode switches to start from corresponding to current time;
  in response to determining the current power mode and the conditioned power mode are the wake mode, switch the current power mode from the wake mode into the sleep mode according to the updated configuration data;
  in response to determining the current power mode and the conditioned power mode are the sleep mode, switch the current power mode from the sleep mode into the wake mode according to the configuration data.

11. The method as claimed in claim 8, wherein the method further comprises:
  receiving, by the server computing device, authentication information from a user;
  verifying, by the server computing device, the authentication information;
  determining, by the server computing device, the user is an administrator; and
  allowing, by the server computing device, the administrator to input data including the power mode switch schedule in the server computing device.

12. The method as claimed in claim 8, wherein the method further comprises:

receiving, by the server computing device, authentication information from a user;

verifying, by the server computing device, the authentication information;

determining, by the server computing device, the user is an authorized user; and adding, by the server computing device, to the configuration data with a condition requiring the authorized user's confirmation on each of scheduled power mode switches from the wake mode to the sleep mode, such that the user decides, on each of the scheduled power mode switches from the wake mode to the sleep mode, between allowing the computing device to enter into the sleep mode as scheduled, and declining the scheduled mode switch and maintaining in the wake mode.

13. The method as claimed in claim 8, wherein the method further comprises:

receiving, by the server computing device, a present power mode switch schedule in configuration data from the at least one computing device;

comparing, by the server computing device, the power mode switch schedule with the present power mode switch schedule in the configuration data;

determining, by the server computing device, if the power mode switch schedule is different from the present power mode switch schedule;

in response to determining the power mode switch schedule is different from the present power mode switch schedule, sending, by the server computing device, the power mode switch schedule to the at least one computing device to update the configuration data; and in response to determining the power mode switch schedule is the same as the present power mode switch schedule, not sending, by the server computing device, the power mode switch schedule to the at least one computing device, and generating, by the server computing device, a notice indicating the power mode switch schedule is the same as the present power mode switch schedule.

14. The method as claimed in claim 8, wherein the method further comprises controlling, by the server computing device, the at least one computing device to:

receive current time information;

compare current time information with the configuration data;

determine if the current time information matches at least one of scheduled power mode switches in the updated configuration data; and in response to determining the current time information does not match any of the scheduled power mode switches, not perform any scheduled power mode switch.

15. A non-transitory computer readable medium storing computer executable code, wherein the computer executable code, when executed at a processor of a server computing device of a system, is configured to:

receive a plurality of inputs, and generate a power mode switch schedule based on the inputs;

control at least one computing device to switch between a wake mode and a sleep mode according to the power mode switch schedule, wherein the at least one computing device functions as a thin client, and the power mode switch schedule comprises at least one sleep time and at least one wake time;

receive an anticipated start time and an anticipated end time of an active period;

determine an earliest wake time of the at least one computing device based on the anticipated start time and an interval such that an administrator is allowed to input a scheduled wake time of the at least one computing device between the earliest wake time and the anticipated start time; and determine a sleep time of the at least one computing device based on the anticipated end time such that the administrator is allowed to input a scheduled sleep time the same as the anticipated end time;

wherein the interval comprises:

a predetermined interval equal to a time period required for the at least one computing device to switch from the sleep mode to the wake mode; and a predetermined reserve time period reserving for possible fault resolution relating to or resulting from waking up the at least one computing device, the predetermined reserve time period equal to or less than the time period needed for the at least one computing device to switch from the sleep mode to the wake mode.

16. The non-transitory computer readable medium as claimed in claim 15, wherein the computer executable code, when executed at the processor, is further configured to control the at least one computing device to switch between the wake mode and the sleep mode by:

sending the power mode switch schedule to the at least one computing device;

controlling the at least one computing device to update configuration data of the at least one computing device with the power mode switch schedule; and controlling the at least one computing device to switch between the wake mode and the sleep mode according to the updated configuration data.

17. The non-transitory computer readable medium as claimed in claim 15, wherein the computer executable code, when executed at the processor, is further configured to control the at least one computing device to:

determine whether current time matches the at least one wake time or at least one sleep time;

receive current power mode information;

compare the current power mode information with configuration data;

determine if a current power mode of the at least one computing device is the same as a power mode conditioned for any of scheduled power mode switches to start from corresponding to current time;

in response to determining the current power mode and the conditioned power mode are the wake mode, switch the current power mode from the wake mode into the sleep mode according to the updated configuration data;

in response to determining the current power mode and the conditioned power mode are the sleep mode, switch the current power mode from the sleep mode into the wake mode according to the configuration data.

* * * * *